United States Patent
Valentino

(10) Patent No.: US 12,410,097 B2
(45) Date of Patent: Sep. 9, 2025

(54) PROCESS TO MAKE CONCRETE USING SAWDUST

(71) Applicant: Antonio Valentino, Jacksonville, FL (US)

(72) Inventor: Antonio Valentino, Jacksonville, FL (US)

( * ) Notice: Subject to any disclaimer, the term of this patent is extended or adjusted under 35 U.S.C. 154(b) by 478 days.

(21) Appl. No.: 17/973,857

(22) Filed: Oct. 26, 2022

(65) Prior Publication Data
US 2024/0140867 A1      May 2, 2024

(51) Int. Cl.
*C04B 18/26*      (2006.01)
*C04B 20/02*      (2006.01)
*C04B 28/02*      (2006.01)
*C04B 40/00*      (2006.01)

(52) U.S. Cl.
CPC .............. *C04B 18/26* (2013.01); *C04B 20/02* (2013.01); *C04B 28/02* (2013.01); *C04B 40/0032* (2013.01); *C04B 40/0042* (2013.01)

(58) Field of Classification Search
CPC ......... C04B 14/06; C04B 18/26; C04B 20/02; C04B 20/1088; C04B 28/02; C04B 28/04; C04B 40/0032; C04B 40/0042; Y02W 30/91
See application file for complete search history.

(56) References Cited

U.S. PATENT DOCUMENTS 1,471,876 A * 10/1923 Zukoski .................. C04B 18/28
                                                            106/609

FOREIGN PATENT DOCUMENTS

GB          2425532 A   * 11/2006   ........... C04B 14/106

* cited by examiner

*Primary Examiner* — Amber R Orlando
*Assistant Examiner* — Ryan Patrick Loughran
(74) *Attorney, Agent, or Firm* — Lawrence J. Gibney

(57) ABSTRACT

Concrete is the most used building material in the world and its use eclipses all other building materials. Sand is an ingredient of any concrete and the addition of treated sawdust reduces the amount of sand that is required. Even though sawdust is added, it does not eliminate the need for sand or the other ingredients found in concrete. However, in order to reduce the environmental impact of mining ingredients, this application has replaced some of the sand that is used in concrete with sawdust that has been saturated. The finished product retains the composition and durability of the finished concrete product and particularly the strength and durability of concrete.

3 Claims, No Drawings

PROCESS TO MAKE CONCRETE USING SAWDUST

RELATED PATENT APPLICATIONS

None

FIELD OF THE INVENTION

Concrete is a composite material composed of cement, water, fine and coarse aggregate. These materials are bonded together with a fluid cement that hardens as it cures over time. Concrete is the second most used construction substance in the world after water and it is the most widely used building material. Its usage is worldwide. The use of concrete is twice that of steel, wood, plastics, and aluminum combined. Concrete is used in a variety of applications but its widespread use results in a number of environmental issues which may be harmful.

The first environmental impact results from the production of cement, which is an ingredient of concrete. The manufacture of cement must be done by applying intense heat to the ingredients for cement and produces large volumes of greenhouse gas emissions. Another environmental concern is the widespread need to mine the sand that forms part of the fine aggregate; this mining produces surface runoff as well as the emission of greenhouse gases during the mining process.

Significant research and development is being directed to reduce the emissions to make concrete or reduce the size of the carbon footprint during the making of concrete. To that end, there has been an impetus to include or at least increase recycled secondary raw material content into the mix to reduce the need for sand that needs to be mined. The addition of alternative ingredients is often not practical because of various considerations.

When the aggregate (fine and coarse aggregate) is mixed with cement and water, the mixture forms a fluid slurry that is easily poured and molded into a variety of shapes. The cement reacts with the water through a process called concrete hydration that hardens over several hours to form a hard matrix that binds the materials together into a durable stone-like material. The time allows the concrete to not only be cast into forms or shapes. The hydration process is exothermic which means ambient temperature plays a significant role in how long it takes concrete to set. Additives are sometimes included in the mix to improve the physical property to the wet mix. In certain applications, concrete is also poured with reinforcing materials such as rebar to provide a tensile strength yielding reinforced concrete. In its natural state, concrete is ideal for compression applications but without inserting rebar it cannot withstand significant tensile loads.

In the past, lime base cement binder such as lime putty were often used to form the cement concrete. Many other non-cementitious types of concrete exists with other methods of binding aggregate together including asphalt concrete with a bitumen miter. This type of concrete is typically used with road services.

Concrete is not to be confused with mortar. Concrete is a building material while mortar is a bonding agent and typically holds bricks, tiles and other masonry units together.

As stated previously cement is made by applying intense amounts of heat over time to lime and aggregate; the end product of this intense heat is a product called "clinker". This clinker is the cement which is sold to consumers in a dry form. Upon application, this cement is then mixed with a pre-determined amount of sand and other filler material (aggregate) and water to form concrete. The ratio of water to cement is typically designated on the bag of cement.

BRIEF DESCRIPTION OF THE INVENTION

In this application, a pre-determined amount of saturated sawdust is added to the mixture of cement, sand, fine and coarse aggregate and water to form concrete. Sawdust is produced in great quantities during the processing of wood and is inexpensive, readily available and requires no mining operations. This application does not eliminate the sand in the manufacture of concrete but reduces the need for sand by approximately fifty percent. This process will significantly decrease the amount of cement used through observations during the mixing process.

The ratio of ingredients in the concrete mixture is as follows: 1 part cement, ½ part sawdust, 1 part sand and 2 parts coarse aggregate. The amount of water that will be used to form the concrete is based on the following ratio: water to cement of 0.82. In order to calculate the amount of water the user must be able to calculate the free water or extra water that will be required. The free water percentage for saturated sawdust is 85.26%, 2.12% for the coarse aggregate and 5.10% for the sand. The moisture content tests can be performed on the materials to check the free water percentages if needed.

In this application the sawdust is treated prior to inclusion into the mixture. For purposes of this application the type of sawdust does not matter, and this sawdust can originate from pine trees, cypress trees, and oak trees to name a few. If the sawdust is not treated prior to the addition into the mixture, the strength of the concrete will be compromised.

The sawdust is saturated at least twenty-four hours in water; there is no specific requirement for the type of water and the water is at room temperature during the saturation process. Once the sawdust is fully saturated, it is placed directly into the mixer. The free water percentages beforehand account for the extra water. The addition of dry sawdust, regardless of the source of the sawdust, does not produce the desired result. The addition of saturated sawdust, however, enables the concrete to retain the strength as well as the durability of the finished concrete product.

Once the sawdust is mixed into a cement mixer with the other ingredients, the usual ASTM (American Society for Testing and Materials) procedures for making concrete are followed. The ASTM procedures involves two minutes of mixing, three minutes of rest and another two minutes of mixing and tamping the mixture twenty-one times and repeating the process.

DRAWINGS

No drawings are required for this application.

DETAILED DESCRIPTION OF THE EMBODIMENTS

In this application concrete is made from cement, sawdust, sand and coarse aggregate and water; the water that may be used is ordinary tap water. The sawdust is first saturated with tap water for a period not to exceed twenty-four hours; this period will allow for completion saturation of the sawdust. It has been determined that a twenty-four hour period of saturation will enable the process for maximum effect; the saturation of the sawdust may occur in a shorter time. Once the sawdust has been fully saturated, it is placed in the concrete mixer for immediate use.

It is the addition of the saturated sawdust into the concrete mixture that is critical. The addition of dry sawdust does not provide the needed strength in the finished product.

The proportion of ingredients that are found in the final mixture is based on the following ratio: 1 part cement, 0.5 part treated sawdust, 1 part sand and 2 parts coarse aggregate.

During the preparation of the product the sawdust is measured after it has been fully saturated and added according to the proportion that is described in the previous paragraph.

In order to make concrete the cement mixture that includes the treated sawdust must be mixed with water. The ratio of water to cement is 0.82, which is a standard ratio in use today. The ratio of 0.82 may be modified slightly. In the example of making five pounds of cement, 4.1 pound of water would be needed.

If five pounds of cement are needed, 2.5 pounds of treated sawdust would be used in addition to five pounds sand and ten pounds coarse aggregate. As stated previously the user adds 4.1 pounds of water based on the water: cement ratio of 0.82, which is a standard ratio.

When concrete is made, the amount of free water must be calculated. Free water is water that does not directly enter into the manufacture of concrete. The percentages of free water for each component that will be required is described according to the following ratios: 85.26% for saturated sawdust, 5.10% for sand and 2.12% for coarse aggregate. The amount of free water is calculated for each component and then subtracted from the total water that will be needed. If the person is making five pounds of concrete, the person would start with 4.1 pounds of water according to the 0.82 water to cement ratio. The amount of water (85.26% of 2.5 pounds equals 2.1315 pounds of water) that is used with the saturated sawdust would then be subtracted from the initial amount of water that is initially needed. Similarly, the amount of free water that is needed for the sand is .2550 pounds and 0.212 pounds for the coarse aggregate. The amount of free water that will be needed in this example (2.1315, 0.2550 and 0.212 or a total of 2.5985 pounds) are subtracted from the starting amount of 4.1 pounds to yield a total amount of water that will be needed to be 1.5015 pounds of water.

The invention claimed is:

1. A process to make concrete with the addition of saturated sawdust which is consisting of the following steps:
   a. measuring a predetermined amount of cement;
   b. measuring a predetermined amount of sawdust;
   c. saturating the sawdust;
      wherein the sawdust is saturated in tap water;
      wherein the sawdust is saturated in tap water for a period of time not to exceed twenty-four hours;
   d. measuring a predetermined amount of fine aggregate;
      wherein the fine aggregate consists of sand;
   e. measuring a predetermined amount of coarse aggregate;
   f. mixing the cement, sawdust, fine aggregate and coarse aggregate;
      wherein the ingredients are mixed according to the following weight ratio: 1 part cement: one-half part treated sawdust: 1 part sand: 2 parts coarse aggregate;
   g. adding a predetermined amount of water;
   h. mixing the ingredients and water in a concrete mixer.

2. The process as described in claim 1 wherein the period of saturation is twenty-four hours.

3. The process as described in claim 1 wherein the period of saturation is less than twenty-four hours.

* * * * *